(12) United States Patent
Nagrodsky et al.

(10) Patent No.: US 10,293,840 B2
(45) Date of Patent: May 21, 2019

(54) WAYSIDE COMMUNICATION SYSTEM USING POWER GRID LINES

(71) Applicant: ALSTOM TRANSPORT TECHNOLOGIES, Saint-Ouen (FR)

(72) Inventors: Nicholas Nagrodsky, Melbourne, FL (US); Richard Lawson, Melbourne Beach, FL (US); Jeffrey Fries, Grain Valley, MO (US); John Hounschell, Melbourne, FL (US); James Kiss, Melbourne, FL (US)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 245 days.

(21) Appl. No.: 15/281,621

(22) Filed: Sep. 30, 2016

(65) Prior Publication Data

US 2018/0093684 A1    Apr. 5, 2018

(51) Int. Cl.
| | |
|---|---|
| *B61L 7/06* | (2006.01) |
| *B61L 5/06* | (2006.01) |
| *H04B 3/54* | (2006.01) |
| *B61L 1/18* | (2006.01) |
| *B61L 23/04* | (2006.01) |
| *B61L 27/00* | (2006.01) |

(52) U.S. Cl.
CPC ............. *B61L 7/06* (2013.01); *B61L 1/188* (2013.01); *B61L 5/06* (2013.01); *B61L 23/044* (2013.01); *B61L 27/0005* (2013.01); *H04B 3/542* (2013.01)

(58) Field of Classification Search
CPC ...... B61L 1/00; B61L 1/02; B61L 1/18; B61L 7/00; B61L 7/02; B61L 7/06; B61L 7/08; B61L 13/00
See application file for complete search history.

(56) References Cited

U.S. PATENT DOCUMENTS 4,619,425 A * 10/1986 Nagel ............... B61L 21/06
246/167 R

* cited by examiner

*Primary Examiner* — Robert J McCarry, Jr.
(74) *Attorney, Agent, or Firm* — Young & Thompson

(57) ABSTRACT

A wayside communication system for transmitting coded current signals through running rails of a railroad track between wayside control devices. A power line common to the wayside control devices is used as the return path for the current signals. The system features train and broken rail detection. The system allows sending signals long distances since rail to rail current leakage is no longer an issue.

8 Claims, 4 Drawing Sheets

WAYSIDE COMMUNICATION SYSTEM USING POWER GRID LINES

BACKGROUND OF THE INVENTION

The present invention relates generally to electric communication between wayside installations next to a railway track by sending a signal through the running rails of the railway track.

U.S. Pat. No. 4,619,425 discloses an example of such electric communication. A solid state code transmitter and receiver device is located at each end of a railroad track section to alternatively transmit data codes through the rails to be received by the other end receiver element. One rail serves as the signal line while the other rail serves as the return path.

One of the main problems with this type of communication is that signals cannot be sent over long distances. Indeed, in case of poor weather or rail or ballast conditions, rail to rail current leakage as well as current leakage to earth will degrade a signal significantly over long distances.

BRIEF SUMMARY OF THE INVENTION

In one embodiment, a communication system is provided for transmitting through a running rail of a railroad track between wayside control devices a coded current signal representing a wayside condition or control. The system comprises two wayside control devices. Each wayside control device has a coded current signal transceiver for electrical connection to a running rail of a railroad track and for transmission of a coded current signal to the other wayside control device and reception of a coded current signal from the other wayside control device via the running rail, and a power supply connection for connection to a power line of a power substation. The two wayside control devices are configured to, when each is connected via its transceiver to the same running rail and connected via its power supply connection to the same power line, exchange coded current signals by generating a coded current signal representing a wayside condition or control at a first one of the two wayside control devices, transmitting the coded current signal from the first wayside control device to the second wayside control device via the running rail, decoding the coded current signal at the second wayside control device thus obtaining the wayside condition or control and returning the decoded current signal back to the first wayside control device via the power supply connections and the power line thus closing the current signal flow loop.

In another embodiment, a method is provided of transmitting through a running rail of a railroad track between wayside control devices a coded current signal representing a wayside condition or control. The method comprises the consecutive steps of generating a coded current signal representing a wayside condition or control at a first wayside control device, transmitting the coded current signal from the first wayside control device to a second wayside control device via the running rail, decoding the coded current signal at the second wayside control device thus obtaining the wayside condition or control, and returning the decoded current signal back to the first wayside control device via a power line common to the wayside control devices thus closing the current signal flow loop.

In a further embodiment, a railroad track communication network is provided, comprising a railroad track having two parallel running rails, a power line of a power substation for providing electrical power to wayside equipment and two wayside control devices. Each wayside control device has a coded current signal transceiver electrically connected to a running rail of the railroad track for transmission of a coded current signal to the other wayside control device and reception of a coded current signal from the other wayside control device via the running rail, and a power supply connection connected to the power line. The two wayside control devices are configured to exchange coded current signals by generating a coded current signal representing a wayside condition or control at a first one of the two wayside control devices, transmitting the coded current signal from the first wayside control device to the second wayside control device via the running rail, decoding the coded current signal at the second wayside control device thus obtaining the wayside condition or control, returning the decoded current signal back to the first wayside control device via the power supply connections and the power line thus closing the current signal flow loop.

DETAILED DESCRIPTION OF THE INVENTION

Figure 1:
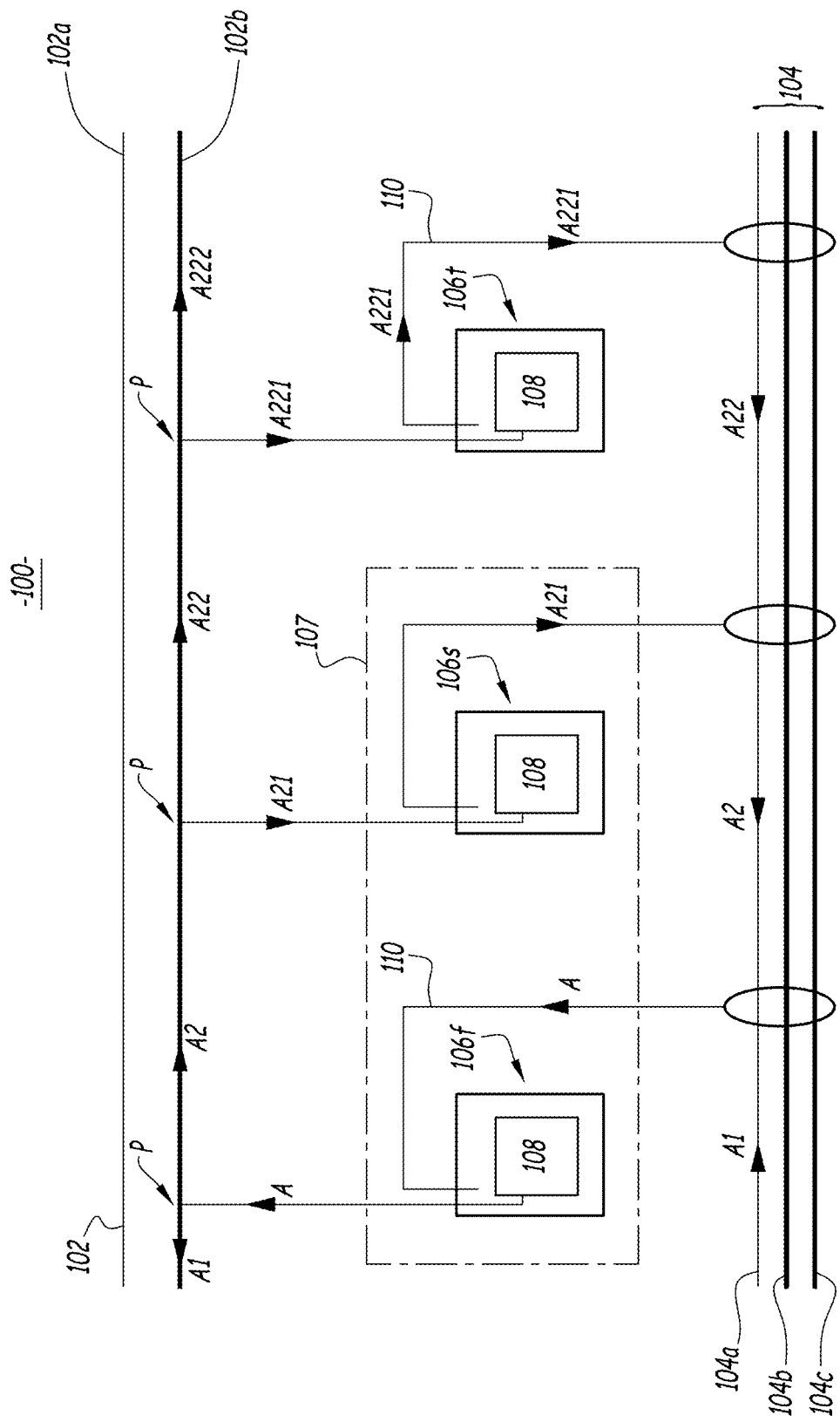
FIG. 1 is a schematic diagram of a railroad track communication network using power substation lines in accordance with a first embodiment of the invention.

FIG. 1 illustrates a railroad track communication network 100 in accordance with one embodiment of the present invention. The communication network 100 includes a railroad track 102, a power line bundle 104 and three wayside control devices 106f, 106s and 106t. At least two of the three wayside control devices together form a communication system 107.

The railroad track 102 is made of two individual running rails 102a and 102b. Trains travel from one station to the other on railroad track 102.

The power line bundle 104 runs alongside the railroad track 102. It provides electrical power (preferably AC power) to wayside equipment located along the railroad track 102. The power line bundle 104 originates at a power substation (not shown). The bundle 104 has three power lines 104a, 104b and 104c. Line 104a corresponds to the hot line, line 104b to the neutral line, and line 104c to the ground line.

The three wayside control devices 106f, 106s and 106t are of the same type. Hence, only one of them, 106f, will be described in detail, this description also holding for the other two.

The wayside control device 106f is an electronic installation located next to the railway track 102. Typically, it has the form of a bungalow housing electronic components, which control the signaling necessary for the safe operation of trains on the railway track 102.

The wayside control device 106f features a coded current signal transceiver 108. The transceiver 108 is electrically connected to running rail 102b of the railroad track 102. The transceiver 108 is configured for transmission of a coded current signal A to other wayside control devices 108 and reception of a coded current signal from other wayside control devices 108 via the running rail 102*b*.

The wayside control device 106*f* is connected to the power lines 104*a*, 104*b*, 104*c* via a power supply connection 110. The electronic components of the wayside control device are powered via this power supply connection 110.

Communication between the three wayside control devices 106*f*, 106*s* and 106*t* is performed as follows.

The first one of the three wayside control devices 106*f* generates a coded current signal A representing a wayside condition or control. This electric current signal A is injected into the running rail 102*b* at a point P. The electric current splits into two components A1 and A2 running in opposite directions along the running rail 102*b*. The further discussion will focus on current component A2. However, this discussion is also applicable in an analogous way to current component A1.

The current signal A2 propagates along the running rail 102*b* until it reaches the connection point P of the second wayside control device 106*s*. At point P, the current signal A2 splits into two components A21 and A22. Current signal A22 runs further along the running rail 102*b*, whereas current signal A21 enters the second wayside control device 106*s*. The transceiver 108 of the second wayside control device 106*s* having received current signal A21 decodes the signal to obtain the wayside condition or control. The second wayside control device 106*s* then initiates certain signaling actions depending on the contents of the decoded signal. The current signal A21 then returns back to the first wayside control device 106*f* from which it originated via one of the power lines 104*a*, 104*b*, 104*c*, thus closing the current signal flow loop.

The current signal component A22 splits into current signal components A221 and A222 at the connection point P of the third wayside control device 106*t*. The current signal component A221 is then detected by the third wayside control device 106*t*, after which it returns back to the first wayside control device 106*f* through one of the power lines 104*a*, 104*b* and 104*c*.

The coded current signals sent by the wayside control devices preferably include a unique identifier identifying the sending wayside control device such that a wayside control device receiving a current signal can determine its origin. This is particularly useful when the running rails 102*a* and 102*b* are continuous, i.e. not sectioned into track circuit blocks via insulated joints.

Figure 2:
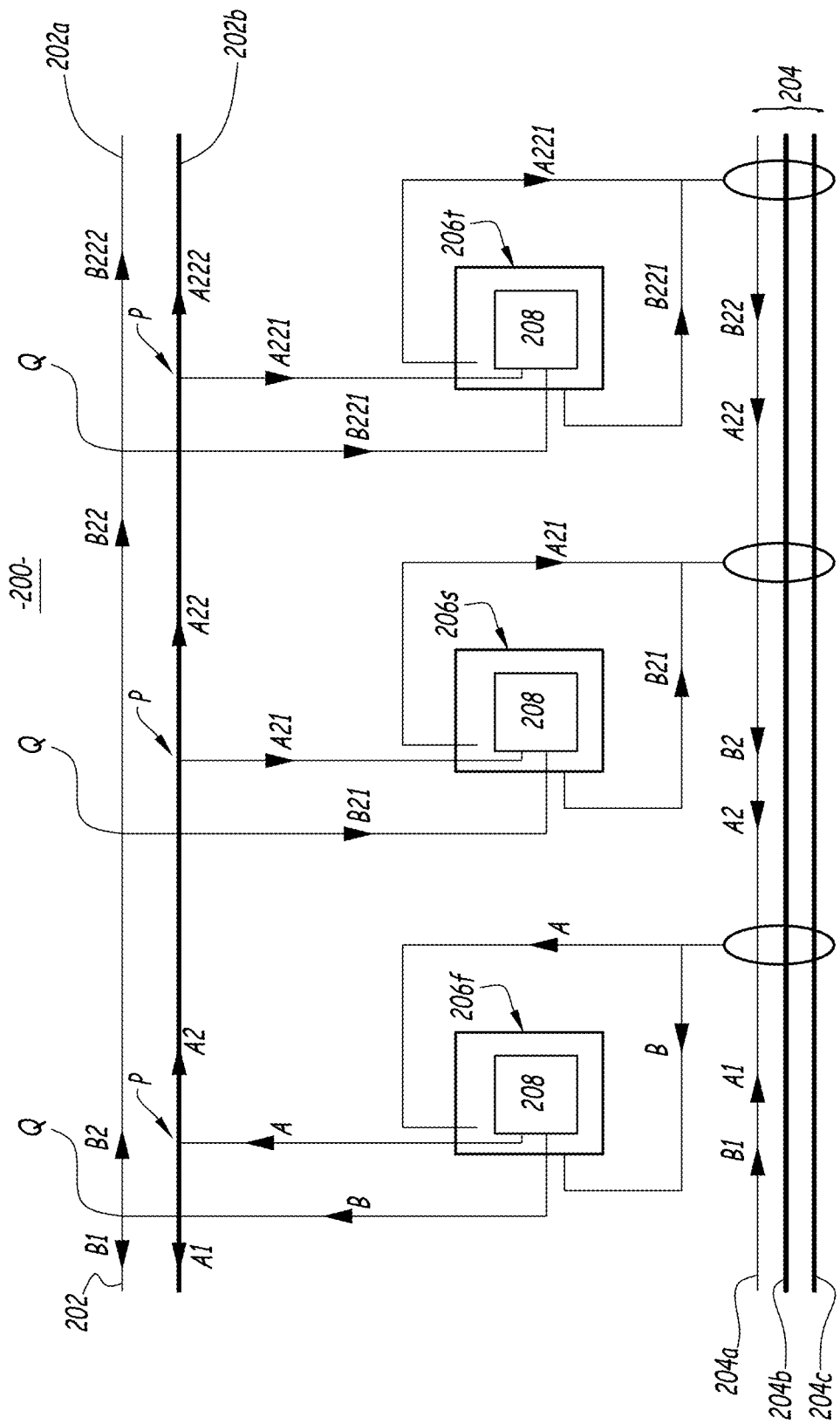
FIG. 2 is a schematic diagram of a railroad track communication network using power substation lines in accordance with a second embodiment of the invention.

FIG. 2 illustrates a railroad track communication network 200 in accordance with a further embodiment of the present invention. This second network 200 has all the elements of the first network 100 of FIG. 1 plus further communication means. Compared to the first network of FIG. 1, the second network 200 is configured for communication between wayside control devices 206*f*, 206*s* and 206*t* over both rails 202*a* and 202*b* of the railroad track 202. Accordingly, the coded current signal transceivers 208 are electrically connected to both running rails 202*a* and 202*b* at points P and Q such that different coded current signals A and B can be exchanged in parallel between the wayside control devices 206*f*, 206*s* and 206*t* via each of the two running rails 202*a* and 202*b*.

Communication over the second rail 202*a* is performed in the same way as communication over the first rail 202*b* explained above with reference to FIG. 1. A second coded current signal B, different from the first coded current signal A, is generated by the first wayside control device 206*f* and injected into the second rail 202*a* at a connection point Q. Like signal A, signal B splits into components B1 and B2, B21 and B22, B221 and B222, etc. The various components are received by the other wayside control devices via their transceivers 208, decoded, and the current returns back to the first wayside control device 206*f* via one of the power lines 204*a*, 204*b* and 204*c* of the power line bundle 204.

The advantage of the second communication network 200 is that more signals can be transmitted in a shorter amount of time, by using both rails 202*a* and 202*b* as transmission lines.

Figure 3:
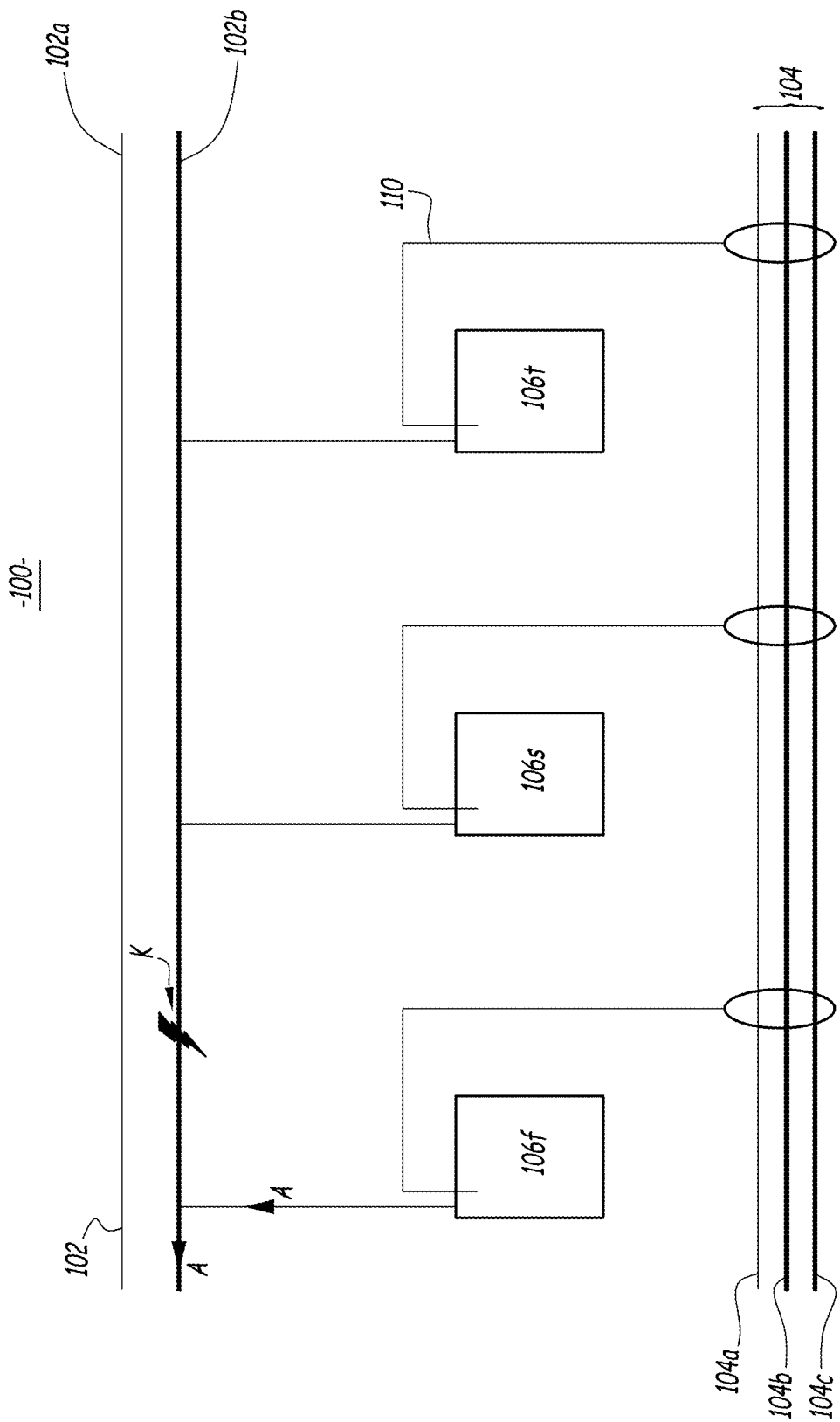
FIG. 3 is a schematic diagram illustrating how the railroad track communication network of FIG. 1 is used to detect a broken rail.

FIG. 3 illustrates how the communication network 100 of FIG. 1 can be used to detect a broken rail. In the illustration, running rail 102*b* has a break K between the two wayside control devices 106*f* and 106*s*. Accordingly, the current signal A sent by the first wayside control device 106*f* cannot reach the second wayside control device 106*s* or the third wayside control device 106*t*. In the absence of any signals from the first wayside control device 106*f* for a certain minimum amount of time, the second wayside control device 106*s* and/or the third wayside control device 106*t* concludes that there must be a break K in the running rail 102*b*.

Figure 4:
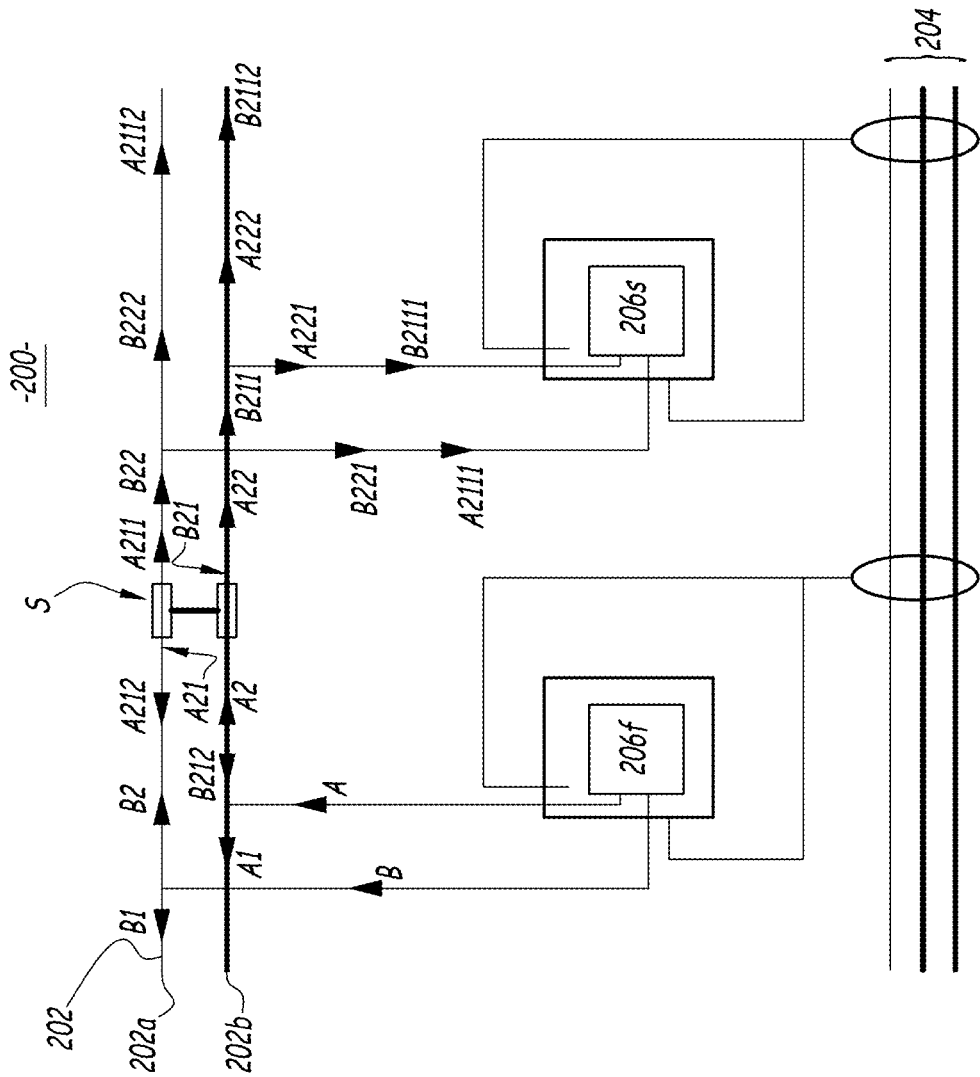
FIG. 4 is a schematic diagram illustrating how the railroad track communication network of FIG. 2 is used to detect the presence of a train on the railroad track.

FIG. 4 illustrates how the communication network 200 of FIG. 2 can be used to detect the presence of a train on the railroad track 202. To simplify, the drawing omits the third wayside control device 206*t*.

When a train is present on the railroad track 202, its wheel sets S act as an electrical shunt between the two running rails 202*a* and 202*b*. To simplify, FIG. 4 only shows one wheel set S. The effect of this electrical shunt S is that signal A and its components are no longer confined to the first rail 202*b*. Likewise, signal B and its components are no longer confined to the second rail 202*a*. As shown in FIG. 4, components of signal A and signal B cross over from one rail to the other. This cross-talk can be detected by the wayside control devices. In case of cross-talk, one deduces the presence of a train on the railroad track 202. Depending on which wayside control device receives which type of cross-talk, one can also determine the position of the train on the railroad track 202.

The communication network 200 of FIG. 2 can of course be used for the detection of a break in the rails 202*a* and 202*b* using the same method as described for the communication network 100.

The present invention has in particular the following advantages:

Rail to rail current leakage is no longer an issue in communications between wayside equipment. This is because the invention does not rely on a differential signal between the rails as in the prior art. Instead one or both rails serve as the signal line(s), and the AC power grid is used as the return path. Since multiple wayside installations typically have AC power, this allows sending signals long distances while still having a common return path to complete the circuit;

The dominant characteristic that limits signal travel is now the series inductance of the rail and the given return path through the power lines. Ballast conditions no longer limit the signal travel length;

There is also the ability to send different signals through each rail to provide broken rail detection as well as train detection;

Insulated joints, which are expensive to maintain, are no longer required to provide isolation or block independence;

There is no need for additional dedicated communication lines, e.g. via radio or fiber optic cable, between wayside equipment.

While the invention has been described in terms of various specific embodiments, those skilled in the art will recognize that the invention can be practiced with modification within the spirit and scope of the claims.

What is claimed is:

1. A communication system for transmitting through an individual running rail of a railroad track between wayside control devices a coded current signal representing a wayside condition or control, the system comprising:
   two wayside control devices,
   each wayside control device comprising:
      a coded current signal transceiver for electrical connection to an individual running rail of a railroad track and for transmission of a coded current signal to the other wayside control device and reception of a coded current signal from the other wayside control device via the running rail; and
      an electrical return path for the individual running rail through a power supply connection to a power line of a power substation,
   wherein the two wayside control devices, when each is connected via its transceiver to the same individual running rail and connected through the power supply connection to the same power line of the power substation, exchange coded current signals by:
      generating a coded current signal representing a wayside condition or control at a first one of the two wayside control devices;
      transmitting the coded current signal from the first one of the two wayside control devices to a second one of the two wayside control devices via the individual running rail;
      decoding the coded current signal at the second one of the two wayside control devices thus obtaining the wayside condition or control; and
      returning the decoded current signal back to the first one of the two wayside control devices via the power supply connection and the power line thus closing the current signal flow loop.

2. The communication system of claim 1 comprising at least three wayside control devices, wherein each wayside control device has a unique identifier, each wayside control device being configured to transmit its identifier together with a coded current signal such that the other wayside control devices receiving the coded current signal can determine its origin.

3. The communication system of claim 1, wherein each coded current signal transceiver is configured for electrical connection to each individual running rails of the railroad track such that different signals can be exchanged between the wayside control devices via each of the two individual running rails.

4. A method of transmitting through a running rail of a railroad track between wayside control devices a coded current signal representing a wayside condition or control, the method comprising the following consecutive steps:
   generating a coded current signal representing a wayside condition or control at a first one of the wayside control devices;
   transmitting the coded current signal from the first one of the wayside control devices to a second one of the wayside control devices via the running rail;
   decoding the coded current signal at the second one of the wayside control devices thus obtaining the wayside condition or control; and
   returning the decoded current signal back to the first one of the wayside control devices via a power supply connection and a power line of a power substation, thus closing the current signal flow loop.

5. The method of claim 4, wherein the second one of the wayside control devices detects a break in said running rail if it fails to receive a coded current signal from the first one of the wayside control devices for a certain minimum amount of time.

6. A method of transmitting through each of two individual running rails of a railroad track between wayside control devices a different coded current signal representing a wayside condition or control, wherein each coded current signal is transmitted through its associated rail with the method according to claim 4.

7. The method of claim 6, wherein the second wayside control device detects the presence of a train on the railroad track if the two different coded current signals are both present on the same individual running rail.

8. A railroad track communication network comprising:
   a railroad track having one individual running rail;
   a power line of a power substation for providing electrical power to a wayside equipment; and
   two wayside control devices, each wayside control device comprising:
   i) a coded current signal transceiver electrically connected to the individual running rail of the railroad track for transmission of a coded current signal to the other wayside control device and reception of a coded current signal from the other wayside control device via the individual running rail; and
   ii) an electrical return path through a power supply connection connected to the power line,
   wherein the two wayside control devices are configured to exchange coded current signals by:
   generating a coded current signal representing a wayside condition or control at a first one of the two wayside control devices;
   transmitting the coded current signal from the first one of the wayside control devices to a second one of the two wayside control devices via the individual running rail;
   decoding the coded current signal at the second one of the two wayside control devices thus obtaining the wayside condition or control; and
   returning the decoded current signal back to the first one of the wayside control devices via the power supply connection and the power line thus closing the current signal flow loop.

* * * * *